July 23, 1957   L. R. PHILLIPS ET AL   2,800,018
PROBE DEVICE FOR FLUID CONDITION MEASURING APPARATUS
Filed March 1, 1954

INVENTORS
Leonard R. Phillips,
Robert L. Miller,
Elliot Godes,
Franz J. Kurth,
BY Carroll Bailey
ATTORNEY ns Patent Office  2,800,018
Patented July 23, 1957

2,800,018

PROBE DEVICE FOR FLUID CONDITION MEASURING APPARATUS

Leonard R. Phillips and Robert L. Miller, East Hartford, and Elliot Godes, Manchester, Conn., and Franz J. Kurth, Mamaroneck, N. Y., assignors to Anemostat Corporation of America, New York, N. Y., a corporation of Delaware Application March 1, 1954, Serial No. 413,382

2 Claims. (Cl. 73—204)

This invention relates to apparatus for measuring the velocity of fluids such as air, and has particular reference to improvements in such apparatus which function to accomplish their purpose by indicating the change in the electrical resistance of an element brought about by exposing the same to a fluid the velocity of which is to be measured.

In apparatus of the character referred to the element referred to constitutes an arm of a Whitestone bridge. In this connection, during use of the apparatus for measuring the velocity of a fluid, in order to avoid unbalancing of the bridge due to the effect of the temperature of the fluid on said arm, a companion arm of the bridge also is exposed to the fluid to compensate for change in temperature of the first mentioned arm by the fluid. Moreover, it is usual to incorporate the said two bridge arms in a small probe device for ready insertion into areas where velocities are to be measured.

The present invention is more particularly concerned with the probe devices of apparatus of the character referred to and has for one of its objects to embody the aforesaid two bridge arms in a probe device in a novel manner so that, regardless of the position in which the probe device may be placed in a fluid the velocity of which is to be measured, there will be substantially an equal amount of flow of fluid over each arm to maintain a proper compensating relationship of the second mentioned arm relative to the first mentioned arm.

In practice, the said two bridge arms usually are composed of windings of extremely fine wire which is easily breakable. Accordingly, another object of the invention is to provide improved means for protecting said bridge arms against breakage or other damage.

With the foregoing and other objects in view, as will become more fully apparent as the nature of the invention is better understood, the same consists in a proble device embodying the novel features of construction, combination and arrangement of parts as are illustrated by way of example in the accompanying drawing and as will be hereinafter more fully described and claimed.

In the accompanying drawing, wherein like characters of reference denote corresponding parts in the different views.

Figure 1:
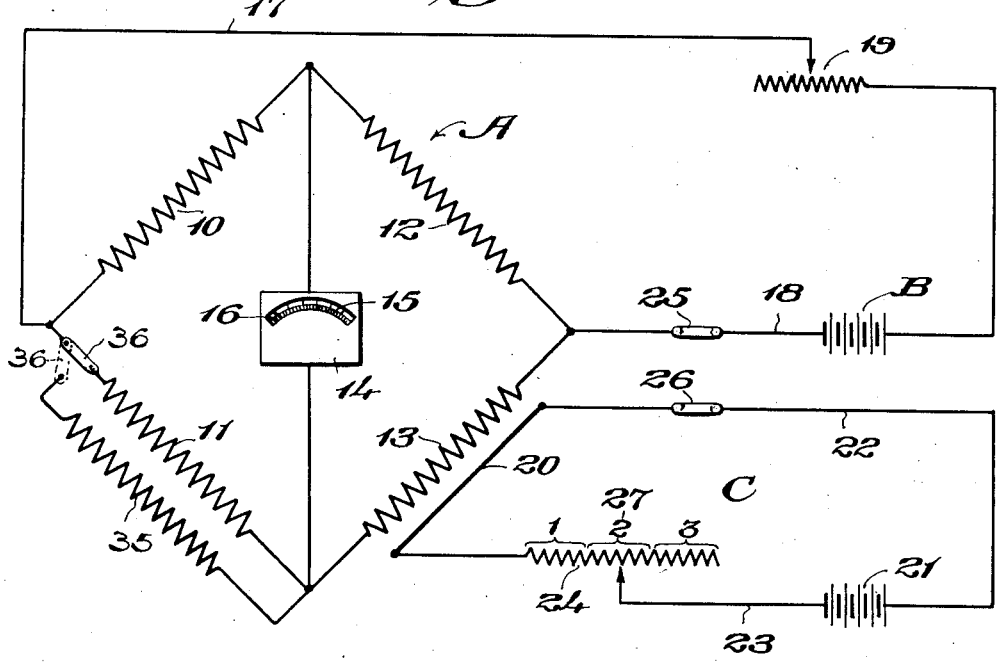
Fig. 1 is a diagrammatic view of a velocity measuring apparatus in which a probe device constructed in accordance with the invention may be used.
Figure 2:
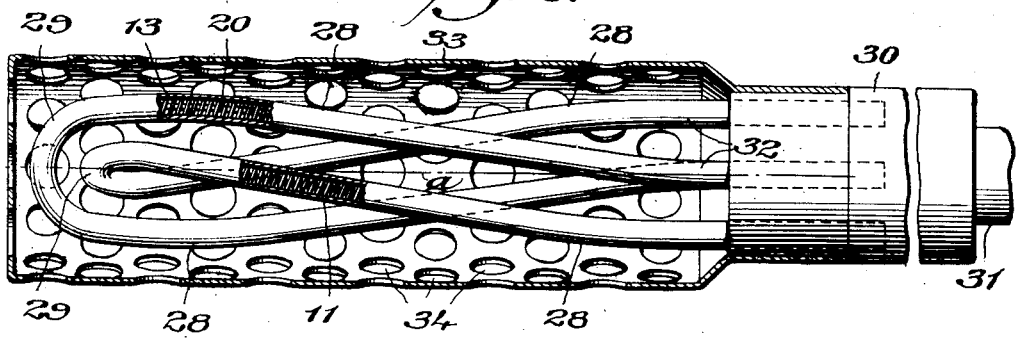
Fig. 2 is a view partly in longitudinal section and partly in side elevation of a probe device constructed in accordance with the invention.
Figure 3:
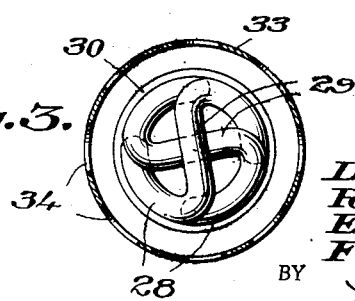
Fig. 3 is a transverse section through the probe device.

Referring to the drawing in detail, first to the apparatus illustrated in Fig. 1, A designates, generally, a Wheatstone bridge, B designates a battery for energizing said bridge, and C designates, generally, means for heating one of the arms of said bridge.

The bridge A comprises, as usual, a first pair of arms, designated as 10 and 11, respectively, and a second pair of arms designated as 12 and 13, respectively. One arm of one pair and the adjacent arm of the other pair, the arms 10 and 12 for example, are composed of a material, such as manganin, which has a substantially zero temperature coefficient of resistance. On the other hand, the other arms of the respective pairs, the arms 11 and 13 for example, are composed of a material, such as nickel, which has a substantially uniform positive temperature coefficient of resistance.

As usual, a current flow indicating instrument 14 is connected across the bridge between the arms of the respective pairs and includes a scale 15 with which cooperates a movable indicating element 16.

Also as usual, the battery B is connected at one side thereof, as by a conductor 17, between the arms of one pair, between the arms 10 and 11 for example, and at the other side thereof is connected, as by a conductor 18, between the arms of the other pair, between the arms 12 and 13 for example.

In one of the conductors 17 or 18, in the conductor 17 for example, is an adjustable resistance 19 for regulating flow of current between the battery B and the bridge A.

The means C for heating one of the bridge arms comprises an electric heating element 20, a battery 21 connected at opposite sides thereof to the respective terminals of said heating element 20 by conductors 22 and 23, respectively, and a variable resistance 24 in one of said conductors 22 or 23, in the conductor 23 for example.

The bridge arms consist of suitable windings of fine wire. Hence, the electric heating element 20 may comprise a length of wire upon which the fine wire of the related bridge arm is wound. In this connection, said electric heating element 20 is associated with one of the positive temperature coefficient of resistance arms 11 or 13, in the present instance the arm 13 of the second pair.

During manufacture of the apparatus and while the two arms 11 and 13 of the bridge are of the same temperature, the bridge is very carefully balanced by, for example, carefully locating the points of connection of the instrument 14 with the bridge. These connections then are soldered or otherwise made permanent so that the balance does not change, but remains fixed.

To use the apparatus for measuring the velocity of a fluid, the bridge circuit is closed by a suitable switch 25. The circuit including the heating element 20 then is closed by a suitable switch 26 with the result that said heating element 20 is heated and thereby heats the bridge arm 13. The resistance of said arm 13 thereby is increased and as a result the bridge is unbalanced. Then, while the two arms 11 and 13 are subjected to a condition of zero fluid flow, the flow of current to the heating element 20 is regulated, as through the variable resistance 24, to cause predetermined deflection of the indicating element 16 to some definite position corresponding to zero fluid flow.

The bridge arms 11 and 13 then are exposed to the fluid the velocity of which is to be measured. The fluid flowing over the heated arm 13 will effect cooling of said arm with consequent decrease in its electrical resistance proportionately to the velocity of the fluid. With decrease in the electrical resistance of the arm 13, the bridge will tend to assume its balanced condition and this will be reflected in return movement of the indicating element 16 from its deflected position. Hence, the amount of movement of said indicating element 16 from its deflected position is a measure of the velocity of the fluid. The scale 15 is, of course, suitable calibrated to indicate the velocity.

If only the bridge arm 13 were exposed to the fluid the velocity of which is to be measured, different temperatures of the fluid might disturb the balance of the bridge. Since, however, the bridge arm 11 also is exposed to the fluid, it acts as a compensator for different temperatures of the fluid and thereby prevents unbalancing of the bridge due to the temperature of the fluid.

Obviously, by varying the degree of heating of the bridge arm 13, the apparatus may be used for measuring various different ranges of velocities. In this connection, the variable resistance 24 may have velocity range designations as indicated at 27.

As aforesaid, the two bridge arms 11 and 13 are embodied in a small probe device for ready insertion into areas where fluid velocities are to be measured. In this connection and in accordance with the invention, the arms 11 and 13 are formed into hairpin or U-shape so that each of them includes a pair of legs 28, 28, connected together by a bight portion 29. Also in accordance with the invention, said arms are disposed with their bight portions 29 in crossed relationship to each other and have the free end portions of their legs 28 suitably fastened to a block 30 at points spaced ninety degrees apart about an axis $a$ which passes through the centers of the bight portions 29. In addition, both arms are bent or twisted helically so that the bight portion and the free end portions of the legs of each arm are disposed in planes at right angles to each other. Consequently, no matter in what position the probe may be held in a stream of fluid the velocity of which is to be measured, substantially equal amounts of fluid will flow over each of the arms 11 and 13 with substantially equal cooling of said arms. Except for unbalance of the bridge due to heating of the arm 13 by the heating element 20, the balance of the bridge therefore will be maintained and velocity measurements will therefore be substantially accurate.

The block 30 may, of course, be provided with a suitable handle 31 by means of which the probe device consisting of the block 30 and the bridge arms 11 and 13 may readily be inserted into an area containing a fluid the velocity of which is to be measured.

As aforesaid, the bridge arms 11 and 13 are composed of suitable windings of extremely fine wire which, if unprotected, might easily become broken or damaged. Therefore, in accordance with the invention, said arms preferably are enclosed in protective tubes 32 of any suitable material wherein they preferably are embedded in a suitable plastic material. However, even the tubes 32 are of very small diameters and therefore are frail so that in themselves they do not afford all desired protection for the fine wire windings of the bridge arms which they encase. Accordingly, a rigid cap 33 of any suitable material is provided for firm engagement over the outer end portion of the block 30 in covering or housing relationship to the tubes 32 to protect said tubes and the bridge arm windings contained therein against damage. In the side wall and the outer end wall of said cap are many holes 34 through which a fluid, a condition of which is to be measured may find ready access to the tubes 32 and to the bridge arm windings contained therein.

From the foregoing description considered in connection with the accompanying drawing, it is believed that the construction and operation of the present probe device will be clearly understood and that its advantages will be appreciated. It is desired to point out, however, that while only a single specific form of the invention has been illustrated and described, the same is readily capable of embodiment in specifically different forms within its spirit and scope as defined in the appended claims.

We claim:

1. In fluid flow measuring apparatus of the Wheatstone bridge type wherein two arms of the bridge are exposed to a fluid the velocity of which is to be measured and said arms are of the positive temperature coefficient of resistance type and one of them is provided with means for heating the same, each of said arms being of hairpin shape and including a pair of legs and a leg-connecting bight portion, said arms being disposed with their bight portions in crossed relationship to each other and with their legs spaced substantially equal distances apart substantially throughout their lengths, said arms being twisted helically about an axis extending between their legs and intersecting said bight portions so that, regardless of the attitude of said arms relative to the direction of flow of the fluid, no material portion of any of said legs acts as a shield to interfere with flow of the fluid over a major portion of any other of said legs.

2. In fluid flow measuring apparatus of the Wheatstone bridge type wherein two arms of the bridge are exposed to a fluid the velocity of which is to be measured and said arms are of the positive temperature coefficient of resistance type and one of them is provided with means for heating the same, each of said arms being of hairpin shape and including a pair of legs and a leg-connecting bight portion, said arms being disposed with their bight portions in crossed relationship to each other and with their legs spaced substantially equal distances apart substantially throughout their lengths, said arms being twisted helically about an axis extending between their legs and intersecting said bight portions and the amount of said twisting being such that the bight portion and the free ends of the legs of each arm are disposed in substantially right angular relationship to each other so that, regardless of the attitude of said arms relative to the direction of flow of the fluid, no material portion of any of said legs acts as a shield to interfere with flow of the fluid over a major portion of any other of said legs.

References Cited in the file of this patent

UNITED STATES PATENTS

| | | |
|---|---|---|
| 1,971,038 | Hamilton | Aug. 21, 1934 |
| 2,458,331 | Borell | Jan. 4, 1949 |
| 2,612,047 | Nilsson et al. | Sept. 30, 1952 |
| 2,675,702 | Buck | Apr. 20, 1954 |